(12) United States Patent
Inoue et al.

(10) Patent No.: US 6,355,135 B1
(45) Date of Patent: Mar. 12, 2002

(54) METHOD OF LAMINATING GAS PERMEABLE SHEET MATERIAL

(75) Inventors: Osamu Inoue; Toshio Kusumi; Jun Asano; Katsutoshi Yamamoto; Osamu Tanaka; Shinichi Chaen; Nobuki Uraoka, all of Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 08/669,840

(22) Filed: Jun. 26, 1996

Related U.S. Application Data

(63) Continuation of application No. 08/302,914, filed on Sep. 21, 1994, now abandoned.

(30) Foreign Application Priority Data

Jan. 25, 1993 (JP) ................................ 5-009796
Jan. 21, 1994 (WO) ................... PCT/JP94/00079

(51) Int. Cl.⁷ .................................. C09J 5/02
(52) U.S. Cl. .................... 156/324.4; 156/164; 156/324; 428/316.6
(58) Field of Search ............................. 156/324.4, 324, 156/164; 428/316.6

(56) References Cited

U.S. PATENT DOCUMENTS

| | | |
|---|---|---|
| 3,072,512 A | 1/1963 | Yves Hubert Dalle |
| 3,463,690 A * | 8/1969 | Converse et al. ............ 156/324 |
| 4,563,229 A * | 1/1986 | Sorez ........................ 156/324 |
| 4,596,837 A | 6/1986 | Yamamoto et al. |
| 4,609,423 A | 9/1986 | Zufang et al. |
| 4,634,621 A * | 1/1987 | Manning et al. ............. 156/164 |
| 5,234,739 A | 8/1993 | Tanaru et al. |
| 5,264,276 A * | 11/1993 | McGregor et al. ....... 428/316.6 |

FOREIGN PATENT DOCUMENTS

| | | |
|---|---|---|
| DE | 901167 | 5/1954 |
| DE | 2641937 | 3/1978 |
| EP | 0410733 | 1/1991 |
| EP | 0480724 | 4/1992 |
| FR | 2429092 | 1/1980 |
| JP | 5118991 | 2/1976 |
| JP | 6283017 | 4/1987 |
| JP | 62122752 | 6/1987 |
| JP | 62249739 | 10/1987 |
| JP | 1194912 | 8/1989 |
| JP | 214889 | 1/1990 |
| JP | 27967 | 2/1990 |
| JP | 3293008 | 12/1991 |
| JP | 4064433 | 2/1992 |
| JP | 4179545 | 6/1992 |
| JP | 5202217 | 8/1993 |

* cited by examiner

*Primary Examiner*—John J. Gallagher
(74) *Attorney, Agent, or Firm*—Birch, Stewart, Kolasch & Birch, LLP

(57) ABSTRACT

A method of laminating at least two gas permeable sheet materials includes: (1) providing at least a first gas permeable sheet material, wherein at least a portion of at least a surface region of the first sheet material is thermoplastic material; (2) providing at least a second gas permeable sheet material of polytetrafluoroethylene; (3) superposing the sheet materials; and (4) contacting the sheet materials with a heating means to heat the thermoplastic material to a temperature from 140° to 230° C., so as to melt the thermoplastic material and laminate the sheet materials to one another, without the application of direct pressure in the thickness direction of the sheet materials during the contacting step so as to form a gas permeable laminate.

10 Claims, 1 Drawing Sheet

METHOD OF LAMINATING GAS PERMEABLE SHEET MATERIAL

This application is a continuation, of application Ser. No. 08/302,914 filed on Sep. 21, 1994, now abandoned.

TECHNICAL FIELD

The present invention relates to a method of laminating a gas permeable (breathable) sheet material such as a non-woven fabric, a woven fabric, a knit, a web, a fibrous mat, a film material and so on. The present invention particularly relates to a method of heat laminating such gas permeable sheet materials together into an integrated laminate form while maintaining their gas permeability.

The present invention also relates to a method of laminating of a sheet material having gas permeability which is used in various industrial fields. The sheet material is used as, for example, a garment material and a sanitary material, a packaging material, various filter materials, a building material, a substrate for an electret material and so on.

BACKGROUND OF THE INVENTION

In a method of laminating a plurality of gas permeable sheet materials into an integral form which has been employed for many years, the sheet material comprising a thermoplastic material are heated to its melting point or higher using a heating roll, and a pressure is vertically applied to the sheet materials using, for example, a nip roll at the same time of or immediately after heating the sheet materials along a thickness direction of the materials so that adhesion through the melted thermoplastic material is accelerated.

However, there is an undesired effect in the above method that the thermoplastic material is rolled by the nip roll, whereby many gas permeable pores through the sheet material are unnecessarily plugged so that original gas permeability of the sheet material cannot be maintained. With such a method of the prior art, a gas permeability retention ratio is said to be at most about 65%.

In order to overcome the above problem, various methods have been proposed to laminate a plurality of the gas permeable materials together into an integral form while maintaining their gas permeability. For example, the following methods can be exemplified:

1) A fusible adhesive is disposed on a gas permeable material in the form of dots or lines, and then other gas permeable material is laminated on the gas permeable material;

2) A tape or film having thermoplasticity is disposed on a gas permeable material with a given separation, and then other gas permeable material is disposed on the gas permeable material so as to heat laminate them (see, for example, Japanese Patent Kokai Publication No. 64433/1992 and Japanese Patent Kokai Publication No. 249739/1987;

3) A thermoplastic synthetic resin is spread on a gas permeable material or a thermoplastic synthetic resin emulsion is applied to a gas permeable material, then other gas permeable material is placed on the gas permeable material, and the both materials are heated to melt the synthetic resin so that the gas permeable materials are laminated together (see, for example, Japanese Patent Kokai Publication No. 179545/1992 and Japanese Patent Kokoku Publication No. 14889/1990);

4) Superposed gas permeable materials are partially heat-fused using an embossing roll (see, for example, Japanese Patent Kokai Publication No. 194912/1989);

5) A non-woven fabric comprising a conjugated fiber (namely, a composite fiber comprising a core/heat-fusible sheath structure) is superposed on a gas permeable material, and they are heat laminated with a minimum pressure applied by a felt calendaring roll (see, for example, Japanese Patent Kokai Publication No. 122752/1987); and 6) A gap (a clearance) between heat laminating rolls, a lamination temperature and a roll rotating speed are adjusted to partially heat-fuse gas permeable materials so as to achieve a fused area ratio of 5 to 95% (see, for example, Japanese Patent Kokai Publication No. 293008/1991).

In the methods of the above 1) to 4), since a surface of the gas permeable material is partially plugged, the gas permeability of the material is decreased so that the gas permeability inherent in the material cannot be fully maintained. In addition, even when the felt calendaring roll is used with the minimum pressure as in the process of 5), the gas permeability is decreased by at least 30%.

Contrary to those methods, since the method of 6) adjusts the gap between the heat laminating rolls and the like to control the heat-fused area in a range of 5 to 95%, almost no decrease of the gas permeability (which is measured as a pressure drop increase) occurs. However, the adjustment of the gap is so sensitive that only about 0.2 mm change of the gap makes it impossible to maintain the gas permeability. In addition, the sensitive adjustment of the gap is required whenever the material or a weight (METSUKE) of the gas permeable material is changed. Further, a commercially available gas permeable material such as a non-woven fabric varies in its thickness. It is, therefore, very difficult to stably apply a pressure to keep a constant gap for the lamination. When a rubber roll is used as a press roll in order to accommodate such variations in thickness, there occurs a problem that the gap cannot be controlled due to thermal expansion of the rubber.

SUMMARY OF THE INVENTION

It is an object of the present invention to overcome the problems as described above, that is, the decrease of the gas permeability and the unstable production of the laminate in the methods of the prior art, and to provide a method of laminating gas permeable materials together while maintaining their gas permeability which process is not affected by ambient factors such as a weight or a thickness of the gas permeable material and which process is applicable for the convenient mass production of the laminate.

As a means to achieve the above object, the present invention provides a method of laminating at least two gas permeable sheet materials characterized in that at least a portion of at least a surface region of at least one of said sheet materials which are adjacent to one another comprises a thermoplastic material, said sheet materials are superposed and then said sheet materials are laminated without direct pressure application to them along a thickness direction of said sheet materials on and after contact with a heating means which heats said thermoplastic material to or above its melting point so as to melt said thermoplastic material whereby said sheet materials are laminated to one another.

Particularly, according to the present invention, there is provided a method in which at least two adjacent gas permeable sheet materials such as a cloth or a non-woven fabric or a film material are laminated without degradation of the gas permeability of the sheet materials characterized in that at least one of said adjacent gas permeable sheet materials comprises a thermoplastic material in at least a portion of at least its surface region, the sheet materials are superposed and then, on and immediately after contact with a heating means (for example, a heating roll or a heating plate) which heats said thermoplastic material to or above its melting point, a pressure is applied to said sheet materials neither positively nor directly along a thickness direction of said sheet materials by, for example, a roll such as a nip roll.

BRIEF DESCRIPTION OF THE DRAWING

In FIG. 1, reference numbers 1, 2 and 3 each indicates an unwind roll, 4 a feed roll, 5 a heating roll, 6 a guiding roll and 7 a wind-up roll.

DETAILED DESCRIPTION OF THE INVENTION

Figure 1:
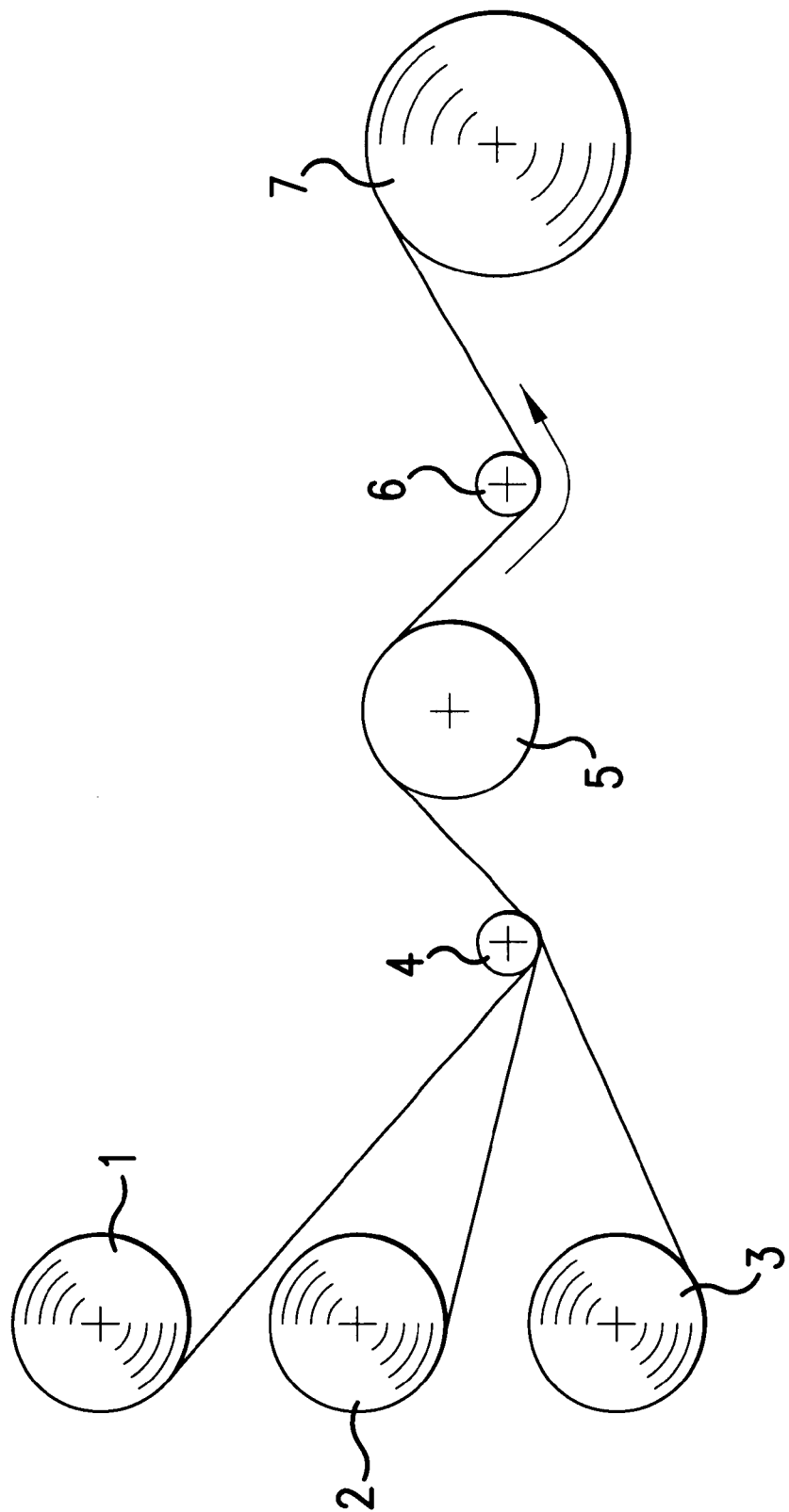
FIG. 1 schematically shows a lamination equipment which can be used for the production of a laminate by the method according to the present invention.

In the present invention, "no pressure is applied immediately after heating" means that no pressure is applied when the thermoplastic material is in a melted condition and still weldable. Further, "without direct pressure application along a thickness direction of the sheet materials" means that no intentional pressure is directly applied along the thickness direction of the sheet materials by, for example, a nip roll. Thus, for example, when guiding rolls are used to transport the sheet materials resulting in that the sheet materials are not aligned along a straight line, a pressure resulting from the non-alignment which is applied to the sheet materials may have a component force which is along the thickness direction. Such transportation of the sheet materials is not deemed to be "direct pressure application". Nor is, spontaneous pressure application (or pressing) to a lower sheet material by the inherent weight of one or more upper sheet material which is stacked on the lower sheet material deemed a direct pressure application".

In the present invention, the gas permeable sheet material means a sheet material having a property such as gas permeability (including moisture permeability and breathability) which is useful as a fabric material and a sanitary material, a packaging material, various filter materials and a building material. For example, a non-woven fabric, a woven fabric, a knit, a web, a fibrous mat and a film material can be exemplified as the gas permeable sheet material.

Further, in the present invention, the thermoplastic material is, for example, a polyolefin (such as a polyethylene, a polypropylene, a polystyrene and so on), a polyester, an ethylene-vinyl acetate copolymer, a polyvinyl chloride and a polyvinylidene chloride. The material is not particularly limited to those materials provided that it has suitable thermoplasticity for the intended application.

The gas permeable sheet material has such a thermoplastic material as described above on at least a portion of at least its surface region. Thus, only the surface region of the gas permeable sheet material may be entirely made of the thermoplastic material. Alternatively, the gas permeable sheet material may be made of the thermoplastic material in its entirely.

The gas permeable sheet material which can be used in the method of the present invention is, for example, a woven fabric or a non-woven fabric which comprises a synthetic resin having the thermoplasticity such as a polyolefin, a polyester, an ethylene-vinyl acetate copolymer, a polyvinyl chloride and a polyvinylidene chloride. In addition, a non-woven fabric or a web as its precursor comprising a conjugated fiber which has a core/sheath structure having a sheath made of the synthetic resin with the thermoplasticity may be exemplified as the gas permeable sheet material. In addition, a shaped material made of such a conjugated fiber may be also exemplified. Further, a composite material of such a non-woven fabric can be used as the gas permeable sheet material.

Particularly, it is known that when the conjugated fibers having such a core/sheath structure are heat pressed to other gas permeable sheet material using a heating press or a lamination roll, the sheath portions having the thermoplasticity are bonded at extreme small separations in line forms or dot forms so that bonded sheet material having less plugging is produced in comparison with a case in which the sheet material is bonded using an adhesive (see, for example, Japanese Patent Kokai Publication No. 83017/1987 and Japanese Patent Kokai Publication No. 122752/1987). Thus, the sheet comprising such a conjugated fiber is one of the most useful materials in the present invention.

In the present invention, the thermoplastic material provides an adhesive function so that it can heat laminate with a gas permeable sheet material which does not have any thermoplasticity. Thus, it is sufficient that at least one of the two adjacent sheet materials which are to be laminated together has thermoplasticity as described above. Although both of the adjacent sheet materials do not necessarily comprise a thermoplastic material, they both may do so.

The gas permeable sheet material which does not have thermoplasticity may be, for example, a stretched porous film made of a polytetrafluoroethylene (hereinafter, referred to as "PTFE") (see Japanese Patent Kokoku Publication No. 18991/1976 and Japanese Patent Kokoku Publication No. 7967/1990), a PTFE skived tape (commercially available under trade name "Zitex" from Performance Plastics Co.), a woven or non-woven fabric of a polyimide fiber, a non-woven fabric of a glass fiber and a sintered metal material having the gas permeability.

What is the most important in the present invention is the absence of a positive pressure application along the direction of the thickness of the gas permeable sheet materials with using, for example, a nip roll during or immediately after the thermoplastic material of the gas permeable sheet material (s) has been heated to at least its melting point, which is different from the method of the prior art. That is, in the prior art, a pressure is applied positively to the sheet materials along their thickness direction so as to help them bond together using a nip roll during or immediately after the materials to be bonded are heated as described above. The present invention positively eliminates this pressure application step.

According to the present invention, by controlling guiding rolls which are required for unwinding from rolls and for winding-up to a roll disposed upstream and downstream of a superposing step of the gas permeable sheet materials to be laminated and also by controlling unwinding speeds of the gas permeable materials, only a very small tension of, for example, 30 g/cm to 170 g/cm applied to at least one gas permeable sheet material can permit heat lamination of the sheet materials when the sheet material having the thermoplastic material is contacted with a heating means such as a heating roll or a heating plate.

In an extreme embodiment, heat lamination even with only positioning of the gas permeable sheet materials one on the other without any tension (namely, substantially no tension is applied to all of the sheet materials: 0 g/cm tension condition) can fully achieve the effect of the present invention.

However, it is not essential to the present invention that the tension is small. What is essential to the present invention is no positive and direct pressure application along the thickness direction of the gas permeable sheet materials while the thermoplastic material is in the melted condition. In the lamination method of the prior art, an excess pressure is applied so that a retention ratio of the gas permeability is not good. Eliminating such an excess pressure application results in, the present invention.

Thus, it is possible to further increase the tension within a tensile strength of the gas permeable sheet material, which allows productivity of the laminate to be increased.

The heating means heats the thermoplastic material of a surface region of at least one of the gas permeable sheet materials to its melting point or higher. In the present invention, the heating means may heat the thermoplastic material to a relatively higher temperature than its melting point. That is, when a tension acts on a certain gas permeable sheet material, the upper limit of the heating temperature should be below the melting point of the material which constitutes the body of the gas permeable sheet material, which makes a broader possible temperature range for the lamination operation so that processing limitations are decreased.

For example, in one preferred embodiment of the present invention, a non-woven fabric is used which is made of a conjugated fiber having a core/sheath structure of which the sheath is made of a polyethylene and of which the core is made of a polyester. In this embodiment, any temperature in a range from the melting point of the polyethylene to the melting point of the polyester, preferably 140° C. to 230° C. may be used for the lamination operation. In addition, satisfactory lamination is possible even when the heating period (thus, the line speed) is greatly changed. Especially, a line speed in a range of 1 to 10 m/min. achieves better lamination. Thus, since the conditions for the lamination operation according to the present invention are so versatile, change in processing conditions is required even when the weight or the thickness of the non-woven fabric is changed, which is also one of the features of the present invention.

For the estimation of the efficacy of the present method, the retention ratio of the gas permeability was measured according to the following procedures.

Pressure Drop Measurement

A laminate of gas permeable sheet materials is cut out into a circle having a diameter of 47 mm, and the circle laminate is set on a holder having a permeation area of 12.6 cm$^2$, then a pressure drop was measured at an air speed of 5.3 cm/sec.

Gas Permeability Retention Ratio

The gas permeability retention ratio was measured according to the following equation:

Gas Permeability Retention Ratio=(Pressure Drop before Lamination/Pressure Drop after Lamination)×100(%)

wherein Pressure Drop before Lamination is a sum of a pressure loss of each gas permeable sheet material to be laminated.

EXAMPLES

Example 1

Lamination equipment as schematically shown in FIG. 1 was used to laminate gas permeable sheet materials according to the present invention. In the lamination equipment of FIG. 1, the gas permeable sheet materials A, B and C are unwound from unwind rolls 1, 2 and 3, respectively and heated with a heating roll 5 through a feed (guiding) roll 4 followed by being wound by a wind roll 7 through a guiding roll 6.

As clearly seen from FIG. 1, there is no roll which positively applies a pressure along a thickness direction of the sheet materials during or immediately after the sheet materials are heated. An amount of a tension applied to each sheet material was adjusted by brakes provided for each of the unwind rolls 1, 2 and 3. The line speed was adjusted with a wind-up speed of a winding unit.

In this Example, a spunbonded non-woven fabric (ELEVES T0703WDO, weight: 70 g/m$^2$, pressure drop: not larger than 1 mmAq, thickness: 260 µm, commercially available from UNITIKA LTD.) of a conjugated fiber having a core/sheath structure of which the sheath was made of a polyethylene and the core was made of a polyester as the gas permeable sheet material "A" was unwound from the unwind roll at a line speed of 5 m/min. under an applied tension of 170 g/cm. A PTFE (polytetrafluoroethylene) porous film (weight: 2 g/m$^2$, pressure drop: 50 mmAq, thickness: 4 µm) as the gas permeable sheet material "B" was superposed on the material "A" under an applied tension of 20 g/cm. In addition, a double layer of spunbonded non-woven fabric (ELEFIT E0303WTO, weight: 30 g/m$^2$, pressure drop: not larger than 1 mmAq, thickness: 190 µm, commercially available from UNITIKA LTD.) of two conjugated fibers each having a core/sheath structure (one of which had a polyethylene sheath and a polyester core, and the other of which had a modified polyester sheath and a polyester core) as the gas permeable sheet material "C" was also unwound from the unwind roll at a line speed of 5 m/min under an applied tension of 40 g/cm so as to be superposed on the materials "A" and "B".

The PTFE porous film used in this Example was prepared according to a process disclosed in the specification of Japanese Patent Application No. 196663/1992 (corresponding to Japanese Patent Kokai Publication No. 202217/1993).

PTFE fine powder (Polyflon Fine Powder F-104 commercially available from Daikin Industries Ltd.) was paste-extruded together with an extrusion aid and rolled to have a film having a thickness of 100 µm, which was then continuously thermally-treated in an oven at 339° C. Then, the film was stretched by 200 times of an original area of the film (a stretched area factor) at an atmospheric temperature of 300° C. followed by heat-setting at 350° C. to result in a porous film having a weight of 2 g/m$^2$, a pressure drop of 50 mmAq and a thickness of 4 µm.

Superposed sheet materials "A", "B" and "C" were contacted with the heating roll heated to a temperature of 190° C. at a line speed of 5 m/min. to have a satisfactorily integrated laminate having a three layer structure which showed a pressure drop of 52 mmAq.

Example 2

On each of both edges of a spunbonded non-woven fabric (ELEVES T1003WDO, weight: 100 g/m$^2$, pressure drop: not larger than 1 mmAq, thickness: 330 µm, commercially available from UNITIKA LTD.) of a conjugated fiber having a core/sheath structure of which the sheath was made of a polyethylene and the core was made of a polyester, a double adhesive tape having a width of 1 cm was placed. Then, the same PTFE porous film (size: 30 cm square) as in Example 1 (weight: 2 g/m², pressure drop: 50 mmAq, thickness: 4 μm) was placed on the non-woven fabric to bond them together at only each edge.

The superposed sheet materials were so placed on a heating plate having a size of 20 cm square that a PTFE film side was contacted with the plate and the heating plate was located in the center of the superposed sheet materials. Then, the heating plate was heated to a temperature of 230° C. and the superposed gas permeable sheet materials were left for 5 minutes before the materials were removed from the plate. Then, the bonded portions with the double adhesive tapes were removed. A satisfactorily integrated laminate showing a pressure drop of 51 mmAq was obtained even when no tension (tension of 0 g/cm) was applied during the production thereof.

Example 3

Example 1 was repeated except that the sheet materials were contacted with the heating roll at 140° C. with a line speed of 1 m/min to produce a laminate. The materials were well integrally laminated and showed a pressure drop of 50 mmAq.

Example 4

Example 1 was repeated except that a PTFE porous film (having a weight of 3 g/m², a pressure drop of 75 mmAq and a thickness of 8 μm) as the material "B" was superposed, and the sheet material "A" was contacted with the heating roll at 230° C. with an applied tension of 30 g/cm and a line speed of 5 m/min. The materials were well integrally laminated and showed a pressure drop of 85 mmAq. In this Example, the gas permeable sheet material "B" was produced according to the same process for the production of the PTFE porous film as in Example 1 except that the stretching ratio based on the stretched area factor was 120 times.

Example 5

The same equipment as shown in FIG. 1 was used except that two unwind rolls were provided.

A spunbonded non-woven fabric (ELEVES T0703WDO, weight: 70 g/m², pressure drop: not larger 1 mmAq, thickness: 260 μm, commercially available from UNITIKA LTD.) of a conjugated fiber having a core/sheath structure of which the sheath was made of a polyethylene and the core was made of a polyester as the gas permeable sheet material "A" was unwound from the unwind roll at a line speed of 10 m/min and an applied tension of 90 g/cm. A PTFE (polytetrafluoroethylene) porous film (weight: 3 g/m², pressure drop: 75 mmAq, thickness: 8 μm) as the gas permeable sheet material "B", which was the same as in Example 4, was superposed on the material "A" at an applied tension of 20 g/cm, and contacted with the heating roll at 190° C. to have a well integrated two layer laminate which showed a pressure drop of 78 mmAq.

Example 6

Using the same equipment as in Example 1, a spunbonded non-woven fabric (ELEVES T1003WDO, weight: 100 g/m², pressure drop: not larger than 1 mmAq, thickness: 330 μm, commercially available from UNITIKA LTD.) of a conjugated fiber having a core/sheath structure of which the sheath was made of a polyethylene and the core was made of a polyester as the gas permeable sheet material "A" was unwound from the unwind roll at a line speed of 5 m/min. under an applied tension of 90 g/cm. A PTFE (polytetrafluoroethylene) porous film (weight: 3 g/m², pressure drop: 75 mmAq, thickness: 8 μm) as the gas permeable sheet material "B", which was the same as in Example 4, was overlapped with the material "A" under an applied tension of 20 g/cm. In addition, a multi layer composite fiber non-woven fabric (Melfit BT0303E, weight: 30 g/m², pressure drop: not larger than 1 mmAq, thickness: 80 μm, commercially available from UNICEL LTD.) of a polyester fiber constituting a surface to be bonded and a polypropylene constituting the other surface was also unwound as the gas permeable sheet material "C" from the unwind roll under an applied tension of 40 g/cm so as to overlap with the materials "A" and "B". The superposed gas permeable sheet materials "A", "B" and "C" were contacted with the heating roll at 170° C. to have a well-integrated three layer laminate showing a pressure drop of 80 mmAq.

Example 7

Using the same equipment as in Example 1, a polyester (PET) spunbonded non-woven fabric (Marix 20707WTA, weight: 70 g/m², pressure drop: not larger than 1 mmAq, thickness: 240 μm, commercially available from UNITIKA LTD.) was unwound as the gas permeable sheet material "A" from. the unwind roll at a line speed of 10 m/min. under an applied tension of 90 g/cm. A spunbonded non-woven fabric (ELEVES T0153WDO, weight: 15 g/m², pressure drop: not larger than 1 mmAq, thickness: 100 μm, commercially available from UNITIKA LTD.) of a conjugated fiber having a core/sheath structure (which had a polyethylene sheath and a polyester core) as the gas permeable sheet material "B" was overlapped with the material "A" (under an applied tension of 20 g/cm), and a PTFE porous film (having a weight of 2 g/cm², a pressure drop of 50 mmAq and a thickness of 4 μm) was further overlapped thereon as the gas permeable sheet material "C" (under an applied tension of 30 g/cm). The superposed sheet materials "A", "B" and "C" were contacted with a heating roll at 160° C. to produce a well integrated laminate having a three layer structure which showed a pressure drop of 55 mmAq.

Comparative Example 1

Example 1 was repeated except that the heating temperature was 190° C. and pressure application was carried out using a nip roll immediately after heating the materials so that an integral laminate having the three layer structure was obtained. Since the laminate showed a pressure drop exceedingly 300 mmAq, it was impossible to obtain a pressure drop value of the laminate.

Comparative Example 2

The same line speed, the same tension, the same sheet materials all as in Example 1 were used and the sheet materials were contacted with the heating roll at a temperature of 100° C. which is below the melting point of the polyethylene. However, the polyethylene of the sheath was not successfully integrated at a temperature below its melting point.

Comparative Examples 3 to 5

Using the same sheet materials as in Example 1, the sheet materials were contacted with the heating roll at 135° C. to 145° C. with a line speed of 5 m/min. while the pressure application was carried out using a nip roll. When the heating temperature was 140° C. (in Comparative Example 4), a laminate having a three layer structure was produced of which pressure drop and lamination state were both relatively good. However, when the heating temperature was 135° C. (in Comparative Example 3), the sheet materials were not successfully integrated. To the contrary, when the heating temperature was 145° C. (in Comparative Example 5), the laminate showed an increased pressure drop and its gas permeability was insufficient.

Thus, it is seen that the temperature range which produces a good laminate is narrow when a nip roller is used, which causes a relatively severe constraint for the production of the laminate.

The results of the above Examples and the Comparative Examples are shown in "Table 1" below.

TABLE 1

| Example | Laminate | Pressing | Heating Temperature (° C.) | Line Speed (m/min.) | Tension A (g/cm) | PTFE | Pressure Drop (mmAq) After Lamination | Gas Permeability Retention Ratio (%) | Lamination State |
|---|---|---|---|---|---|---|---|---|---|
| 1 | ELEVES/PTFE/ELEFIT | No | 190 | 5 | 170 | 50 | 52 | 96 | good |
| 2 | ELEVES/PTFE | No | 230 | 5 (static) | 0 | 50 | 51 | 98 | good |
| 3 | ELEVES/PTFE/ELEFIT | No | 140 | 1 | 170 | 50 | 50 | 100 | good |
| 4 | ELEVES/PTFE/ELEFIT | No | 230 | 5 | 30 | 75 | 85 | 88 | good |
| 5 | ELEVES/PTFE | No | 190 | 10 | 90 | 75 | 78 | 96 | good |
| 6 | ELEVES/PTFE/Melfit | No | 170 | 5 | 90 | 75 | 80 | 94 | good |
| 7 | PET non-woven fabric/ ELEVES/PTFE | No | 160 | 10 | 90 | 50 | 55 | 91 | good |
| Comp. 1 | ELEVES/PTFE/ELEFIT | Yes | 190 | 5 | 170 | 50 | unmeasured | — | good |
| Comp. 2 | ELEVES/PTFE/ELEFIT | No | 100 | 5 | 170 | 50 | 50 | 100 | bad |
| Comp. 3 | ELEVES/PTFE/ELEFIT | Yes | 135 | 5 | 90 | 50 | 50 | 100 | bad |
| Comp. 4 | ELEVES/PTFE/ELEFIT | Yes | 140 | 5 | 90 | 50 | 61 | 82 | good |
| Comp. 5 | ELEVES/PTFE/ELEFIT | Yes | 145 | 5 | 90 | 50 | 106 | 47 | good |

Pressing: Pressing with nip roll immediately after heating
Unmeasured: Pressure drop above 300 mmAq.
Lamination state: "good" (integral form to be readily handled); "bad" (not integral)

EFFECT OF THE INVENTION

Eliminating the positive pressure application during or immediately after the thermoplastic material is melted, which has been employed in the prior methods, provides a laminate having a higher gas permeability retention ratio. Such a lamination method is particularly useful when an increase of the pressure drop due to the lamination for the gas permeable material laminate causes a problem, especially when a filter material is laminated on a material which supports the filter material. That is, the gas permeability inherent in the filter material is maintained by laminating the filter material with the supporting material (which is, of course, gas permeable) according to the method of the present invention. In such a case, the supporting material provides mechanical strength and the gas permeability retention ratio of the supporting material is not a problem. In addition, the present invention is useful when a plurality of filter materials are laminated.

Further, in other applications in which the gas permeability of the material is to be maintained, for example the production of a fabric for a sportswear which is gas permeable and/or waterproof, the gas permeability inherent in the material itself is kept by the method according to the present invention, so that the present process is highly effective.

We claim:
1. A method of laminating at least two gas permeable sheet materials, comprising:
providing at least a first gas permeable sheet material, wherein at least a portion of at least a surface region of said first sheet material comprises a thermoplastic material;
providing at least a second gas permeable sheet material of polytetrafluoroethylene;
superposing said sheet materials; and
contacting said sheet materials with a heating means, thereby heating said thermoplastic material to a temperature from 140° to 230° C. so as to melt said thermoplastic material and laminate said sheet materials to one another, without the application of direct pressure in the thickness direction of said sheet materials, either during or after said contacting step, so as to form a gas permeable laminate.
2. The method according to claim 1 wherein said first gas permeable sheet material is a spunbonded non-woven fabric of a conjugated fiber having a core/sheath structure which sheath is made of a polyethylene and of which core is made of a polyester, or a composite of the fabric.
3. The method according to claim 1 wherein a line speed is in a range of 1 to 10 m/min.
4. The method according to claim 1, wherein only two gas permeable sheet materials are provided.
5. The method according to claim 1, wherein the entire surface region of said first sheet material is a thermoplastic material.
6. The method according to claim 1, wherein the entire first sheet material is a thermoplastic material.
7. The method according to claim 1, wherein the heating means is a heating roller.
8. The method according to claim 1, wherein said first gas permeable sheet material is a woven fabric or a non-woven fabric comprising a synthetic resin.
9. The method according to claim 8, wherein the synthetic resin is selected from the group consisting of polyolefin, polyester, ethylene-vinyl acetate copolymer, polyvinyl chloride and polyvinylidene chloride.
10. The method according to claim 1, wherein said thermoplastic material is selected from the group consisting of polyethylene, polypropylene, polystyrene, polyester, ethylene-vinyl acetate copolymer, polyvinyl chloride and polyvinylidene chloride.

* * * * *

UNITED STATES PATENT AND TRADEMARK OFFICE
CERTIFICATE OF CORRECTION

| | |
|---|---|
| PATENT NO. | : 6,355,135 B1 |
| DATED | : March 12, 2002 |
| INVENTOR(S) | : Inoue, Osamu, Kusumi, Toshio, Asano, Jun, Yamamoto, Katsutoshi, Tanaka, Osamu, Chaen, Shinichi and Uraoka, Nobuki |

It is certified that error appears in the above-identified patent and that said Letters Patent is hereby corrected as shown below:

<u>Title page,</u>
Related U.S. Application Data, section before "now abandoned" insret -- which was filed as application No. PCT/JP94/00079, January 21, 1994 --; and delete from the Foreign Application Priority Data, section "January 21, 1994 (WO)...PCT/JP94/00079".

Signed and Sealed this

Third Day of September, 2002

*Attest:*

*Attesting Officer*

JAMES E. ROGAN
*Director of the United States Patent and Trademark Office*